US012648838B2

(12) United States Patent
Te Velde et al.

(10) Patent No.: US 12,648,838 B2
(45) Date of Patent: Jun. 9, 2026

(54) INTERDENTAL SPACE DETECTION

(71) Applicant: KONINKLIJKE PHILIPS N.V.,
Eindhoven (NL)

(72) Inventors: Mart Kornelis-Jan Te Velde, Helmond
(NL); Bart Gottenbos, Budel (NL);
Mark Thomas Johnson, Arendonk
(BE); Lutz Christian Gerhardt,
Eindhoven (NL)

(73) Assignee: KONINKLIJKE PHILIPS N.V.,
Eindhoven (NL)

( * ) Notice: Subject to any disclaimer, the term of this
patent is extended or adjusted under 35
U.S.C. 154(b) by 424 days.

(21) Appl. No.: 17/916,358

(22) PCT Filed: Mar. 29, 2021

(86) PCT No.: PCT/EP2021/058062
§ 371 (c)(1),
(2) Date: Sep. 30, 2022

(87) PCT Pub. No.: WO2021/198123
PCT Pub. Date: Oct. 7, 2021

(65) Prior Publication Data
US 2023/0218377 A1 Jul. 13, 2023

(30) Foreign Application Priority Data
Apr. 1, 2020 (EP) .................................... 20167452

(51) Int. Cl.
*A61C 19/04* (2006.01)
*A61C 17/02* (2006.01)
(52) U.S. Cl.
CPC .......... *A61C 19/04* (2013.01); *A61C 17/0211*
(2013.01)

(58) Field of Classification Search
CPC ............................ A61C 17/0211; A61C 19/04
See application file for complete search history.

(56) References Cited

U.S. PATENT DOCUMENTS

| | | | | | |
|---|---|---|---|---|---|
| 5,752,832 | A | * | 5/1998 | Vardimon | A61C 19/04 433/68 |
| 5,874,677 | A | * | 2/1999 | Bab | A61C 19/04 73/598 |
| 6,241,519 | B1 | | 6/2001 | Sedelmayer | |

(Continued)

FOREIGN PATENT DOCUMENTS

| | | | |
|---|---|---|---|
| DE | 202010011293 U1 | 11/2010 | |
| DE | 202019002752 U1 | 9/2019 | |

(Continued)

OTHER PUBLICATIONS

International Search Report and Written Opinion Dated Jun. 25,
2021 for International Application No. PCT/EP2021/058062 Filed
Mar. 29, 2021.

*Primary Examiner* — Nicholas D Lucchesi

(57) ABSTRACT

The present invention relates to oral care. In order to
improve the effectiveness of a flossing device, an interdental
space detection component is proposed for detecting an
interdental space. The interdental space detection compo-
nent may be integrated in a brush head with integrated
flossing function. The fluidic flossing function may selec-
tively be switched on at the interdental space, thereby saving
flossing fluid and preventing ineffective flossing outside the
interdental space.

16 Claims, 11 Drawing Sheets

(56) References Cited

U.S. PATENT DOCUMENTS

| | | | | |
|---|---|---|---|---|
| 6,413,086 | B1 * | 7/2002 | Womack | A61C 19/04 |
| | | | | 33/513 |
| 9,428,573 | B2 | 8/2016 | Wong et al. | |
| 2002/0150859 | A1 * | 10/2002 | Imgrund | A61C 7/00 |
| | | | | 433/24 |
| 2005/0266371 | A1 * | 12/2005 | Chu | A61C 19/04 |
| | | | | 433/72 |
| 2011/0143310 | A1 | 6/2011 | Hunter | |
| 2012/0003601 | A1 | 1/2012 | Hunter et al. | |
| 2015/0348320 | A1 * | 12/2015 | Pesach | A61C 19/043 |
| | | | | 382/128 |
| 2016/0331113 | A1 | 11/2016 | Follows et al. | |
| 2017/0079755 | A1 * | 3/2017 | Kovacevic-Milivojevic | |
| | | | | A61C 15/00 |
| 2018/0078347 | A1 * | 3/2018 | Falkel | A61C 9/0046 |
| 2018/0103747 | A1 * | 4/2018 | Lavezzo | A46B 9/045 |
| 2018/0125621 | A1 | 5/2018 | Tweedie et al. | |
| 2018/0368694 | A1 * | 12/2018 | Abrams | A61C 9/006 |
| 2019/0223991 | A1 * | 7/2019 | Kramer | A61C 17/028 |
| 2020/0146435 | A1 | 5/2020 | Rmaile et al. | |
| 2020/0329857 | A1 * | 10/2020 | Deane | A61C 17/221 |
| 2021/0045674 | A1 * | 2/2021 | Sheffers | A61B 5/4552 |
| 2022/0175504 | A1 * | 6/2022 | Gottenbos | A46B 13/06 |
| 2022/0192807 | A1 * | 6/2022 | Gerhardt | A46B 5/0095 |
| 2023/0082672 | A1 * | 3/2023 | Weinstein | A61B 5/682 |
| | | | | 433/6 |
| 2023/0301764 | A1 * | 9/2023 | Gottenbos | A61C 17/028 |
| 2023/0320827 | A1 * | 10/2023 | Johnson | A61C 17/28 |
| | | | | 433/27 |
| 2024/0008964 | A1 * | 1/2024 | Johnson | A61C 17/221 |

FOREIGN PATENT DOCUMENTS

| | | | | |
|---|---|---|---|---|
| JP | | 2509336 | B2 | 6/1996 | |
| WO | WO-2018234129 | A1 * | 12/2018 | A46B 13/02 |

* cited by examiner

Top view

Force on opposite sides:
Circuit is closed

Force on one side:
Circuit is open

No Force:
Circuit is open side view

Tooth

14

12

14

12

PROBE MOTION PARALLEL TO GUM LINE

PROBE MOTION PERPENDICULAR TO GUM LINE

INTERDENTAL SPACE DETECTION

This application is the U.S. National Phase application under 35 U.S.C. § 371 of International Application No. PCT/EP2021/058062, filed on Mar. 29, 2021, which claims the benefit of EP Application Serial No. 20167452.0, filed Apr. 1, 2020. These applications are hereby incorporated by reference herein.

FIELD OF THE INVENTION

The present invention relates generally to oral care, and, in particular to an interdental space detection component, to an oral care implement, and to an oral care device.

BACKGROUND OF THE INVENTION

To facilitate proper oral cavity health, it is important to ensure that there is adequate cleaning of all dental surfaces, including the interproximal space between teeth. Research has shown that improper cleaning of interproximal spaces leads to gum and periodontal disease, and can lead to caries.

Dental practitioners typically recommend that their patients clean between the teeth using various interdental cleaning methods or devices such as floss, an interdental brush, or a water jet, among other methods. Dental floss, for example, is often recommended for individuals with narrow interdental spaces, and interproximal brushes have been recommended for periodontal patients or for patients with open embrasures.

A flossing device is a device to help clean the interdental space with a jet of fluid. The jet force of the fluid jet removes the dental plaque. Flossing devices are typically only effective at the interdental space. Flossing outside the interdental space has limited effectiveness and can lead to spillage of flossing fluid and undesired dispense of liquid in the mouth.

DE 20 2010 011293 U1 discloses a measuring gauge for measuring implant spacing. The measuring gauge comprises a first mandrel on a base body and a second mandrel on a sliding element.

DE 20 2019 002752 U1 discloses a dental device for probing interdental spaces. The probe comprises different probing sections, with the thickness of the probe increasing from the first to the last probing section.

WO 2018/234129 A1 discloses a function head of an oral care device configured to determine the size of an interproximal space and dynamically adjust oral care accordingly. The function head comprises a mechanism composed a fixed inner part and two movable outer parts on either side of the inner part.

SUMMARY OF THE INVENTION

There may be a need to improve the effectiveness of a flossing device.

The object of the present invention is solved by the subject-matter of the independent claims, wherein further embodiments are incorporated in the dependent claims. It should be noted that the following described aspects of the invention apply also for the interdental space detection component, the oral care implement, and the oral care device.

According to a first aspect of the present invention, there is provided an interdental space detection component for use with an interdental or oral care device. The interdental space detection component comprises an interdental probe insertable into an oral cavity of a user for interdental space detection. The interdental probe is configured to detect an interdental space by detecting a presence of teeth on two sides of the interdental probe within the oral cavity.

In other words, an interdental probe is proposed for use with an oral care device. The interdental probe is arranged to be sensitive to the presence of teeth on two sides of the interdental probe. The interdental space detection component may be integrated in a brush head with integrated flossing function. The fluidic flossing function may selectively be switched on at the interdental space, thereby saving flossing fluid and preventing ineffective flossing outside the interdental space.

The interdental space detection component may refer to a component with a body portion terminating with the interdental probe. The body portion may be used to be mounted to a body of an oral care implement, such as a brush head. In some examples, the interdental space detection component may be integrated in an oral cleaning head for use with the oral care device. In some examples, the interdental space detection component may be removably attached to an oral cleaning head for use with the oral care device.

The interdental probe may be a portion of the interdental space detection component that can be put inside an oral cavity for interdental space detection. In some examples, the interdental probe may have a dimension that is suitable for being positioned between two neighboring teeth for detecting a presence of teeth on two sides of the interdental probe. For example, the interdental probe may have a cylindrical shape with a diameter of 1 mm to 4 mm. In some examples, the interdental probe may comprise a nozzle configured for delivering a working fluid to the teeth of the user. The interdental probe with a nozzle may also be referred to as sensitized nozzle orifice. For example, the interdental probe may be attached to or integrated in a brush head or another oral care device with a flossing function. The interdental probe may provide an output signal that controls the flossing function to be selectively switched on at the interdental space, thus saving flossing fluid and preventing ineffective flossing outside the interdental space.

The oral care device may refer to any type of oral care devices. Examples of oral care devices may include an oral irrigator, a tooth brush, a mouthpiece, or other oral care device. However, the disclosure is not limited to these enumerated devices, and thus the disclosure and embodiments disclosed herein can encompass any oral care device.

In some examples, the interdental probe may be arranged to be sensitive to being wedged between two neighboring teeth. This may be achieved by detecting deformation on opposite sides of the interdental probe with e.g. contact pads, or by detecting the force with a force sensor or a pressure sensor. This will be explained hereafter and particularly with respect to the embodiments illustrated in FIGS. 1 to 5.

In some examples, the interdental probe is arranged to be sensitive to the respective distances between the interdental probe and two neighboring teeth. For example, the interdental probe may comprise one or more proximity electronic elements able to detect the presence of nearby objects without any physical contact. Examples of the proximity electronic elements include, but are not limited to, inductive electronic element, capacitive electronic element, optical electronic element, or acoustic distance electronic element. As the teeth are coated with saliva, contact may also be measured by electrical conductance. This will be explained hereafter and particularly with respect to the embodiments illustrated in FIGS. 6A and 6B.

In some examples, detecting blocking of flow may be used to detect contact with two teeth on two sides of the interdental probe. For this to work, both opposite sides should harbor a fluid channel that delivers a flow of fluid, which can be gas or liquid. Each fluid channel should be connected to a fluid feeding system in the handle, having a pressure sensor in the system for detecting the pressure change due to the blocking of the flow. In this example, the interdental probe does not provide any output signal. Instead, the pressure sensor in the handle detects blocking of the flow and provide an output signal indicative the presence of teeth on two sides of the interdental probe. This will be explained hereafter and particularly with respect to the embodiments illustrated in FIGS. 7A and 7B.

In some examples, the interdental probe may be equipped with fiber optic elements. The interdental probe may be attached to an oral cleaning head of the oral care device, whereas the light source and optical detector may be provided in the handle of the oral care device. This will be explained hereafter and particularly with respect to the embodiments illustrated in FIG. 8.

In some examples, the interdental probe is arranged to vibrate within an interdental space between two neighboring teeth and to provide a signal the frequency of which depends on the interdental probe being at an interdental space. This will be explained hereafter and particularly with respect to the embodiments illustrated in FIGS. 10 and 11.

The interdental space detection component may work together with the oral care device for interdental space detection. For example, the interdental space detection component may need to be connected to the oral care device and powered by a rechargeable battery inside the oral care device.

According to an embodiment of the present invention, the detection is based on at least one of: electric, pressure, and optical detection.

According to an embodiment of present invention, the detection is based on electric detection. The interdental probe comprises at least one electronic element configured to be sensitive to being wedged between two neighboring teeth.

According to an embodiment of the present invention, the at least one electronic element comprises at least one of: at least two contact pads configured to connect to form a closed circuit when wedged between two neighboring teeth, a force sensor and/or a pressure sensor configured to be stressed when wedged between two neighboring teeth, a sensor array configured to detect opposite forces when wedged between two neighboring teeth, and a strain gauge attachable to the interdental probe for detecting deformation at opposite sides of the interdental probe when wedged between two neighboring teeth.

According to an embodiment of the present invention, the detection is based on electric detection. The interdental probe comprises at least one electronic element configured to detect respective contacts or distances on two sides of the interdental probe.

According to an embodiment of the present invention, the electronic element comprises at least one of: an inductive sensor, a capacitive sensor, an optical sensor, and an acoustic sensor.

According to an embodiment of the present invention, the detection is based on pressure detection. The interdental probe comprises a first fluid channel and a second fluid channel for delivering a flow of fluid to two fluid-exit positions on the interdental probe for detecting a pressure change in both the first and second fluid channels due to a presence of teeth on two sides of the interdental probe.

Each fluid channel may be connected to a fluid feeding system in the body portion of an oral care device having a pressure sensor in the system.

According to an embodiment of the present invention, the detection is based on optical detection. The interdental probe comprises a first optical channel and a second optical channel for delivering light to two light-exit positions on the interdental probe for detecting respective distances of the two light-exit positions with respect to teeth on two sides of the interdental probe.

The light source and sensor may be arranged in the body portion of an oral care device, but transported to and from the tip using an optic fibre.

According to an embodiment of the present invention, the interdental space detection component comprises a flexible element extending from the interdental probe on at least two opposite sides of the interdental probe. The interdental probe is configured to detect a presence of teeth on two sides of the flexible element within the oral cavity.

According to an embodiment of the present invention, the interdental probe is configured to vibrate at a vibrational frequency within an interdental space between two neighboring teeth and to provide an output signal, the frequency of which is dependent on a presence of teeth on two sides of the interdental probe.

According to an embodiment of the present invention, the interdental probe is provided in a mouthpiece 38 (shown in FIG. 1A).

According to a second aspect of the present invention, there is provided an oral care implement for an oral care device. The oral care implement comprises an interdental space detection component according to the first aspect and any associated example and a connection portion for connecting the oral care implement to the oral care device.

According to a third aspect of the present invention, there is provided an oral care device. The oral care device comprises a) an interdental space detection component according to the first aspect and any associated example and an oral care implement according to the second aspect, and b) a body portion arranged to comprise the interdental space detection component or be coupled to the oral care implement.

According to an embodiment of the present invention, the body portion comprises a fluid feeding system. The fluid feeding system comprises a pressure sensor configured to detect a pressure change in at least two channels of an interdental probe of the interdental space detection component to determine whether the at least two channels are both blocked by two neighboring teeth of an interdental space and to provide an output signal indicative of a presence of teeth on at least two sides of the interdental probe.

According to an embodiment of the present invention, the body portion further comprises a controller. The controller is configured to receive an output signal from at least one of the interdental space detection component and the pressure sensor of the body portion, and to process the received output signal. The controller is further configured to control the oral care device to adapt an oral care action based on a result of the processing.

In this detailed description of the present disclosure, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present disclosure.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

The term "controller" is used generally to describe various apparatus relating to the operation of a stream probe apparatus, system, or method. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs). These and other aspects of the present invention will become apparent from and be elucidated with reference to the embodiments described hereinafter.

In various implementations, a processor or controller may be associated with one or more storage media (generically referred to herein as "memory," e.g., volatile and non-volatile computer memory). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present disclosure discussed herein. The terms "program" or "computer program" are used herein in a generic sense to refer to any type of computer code (e.g., software or microcode) that can be employed to program one or more processors or controllers.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

6

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

Embodiments disclosed herein relate to interdental probe that is insertable into an oral cavity of a user and can be used to detect a presence of teeth on two sides of the interdental probe within the oral cavity of a subject. Examples herein refer to use by a person (i.e. a human user). However, such apparatus may alternatively be used to perform the detection within the oral cavity of a different subject, such as an animal.

The interdental probe disclosed herein is indicated as being suitable for an oral care device. It is envisaged that such an interdental probe may be incorporated into an existing oral care device, such as a power toothbrush, an oral irrigation device, or a mouthpiece. As will become apparent, is also envisaged that such an interdental probe may be supplemented with additional oral care means, so that the oral care device incorporating such an interdental probe may additionally be used to perform oral care tasks, such as interproximal cleaning.

In some examples, the oral care device may be a flossing device that helps clean the interdental space with a jet of fluid. The jet force of the fluid jet removes the dental plaque. The interdental probe may be a modification of a conventional nozzle with one or more radially and/or axially arranged ring sensor segments provided near a nozzle exit of the conventional nozzle.

Figure 13:
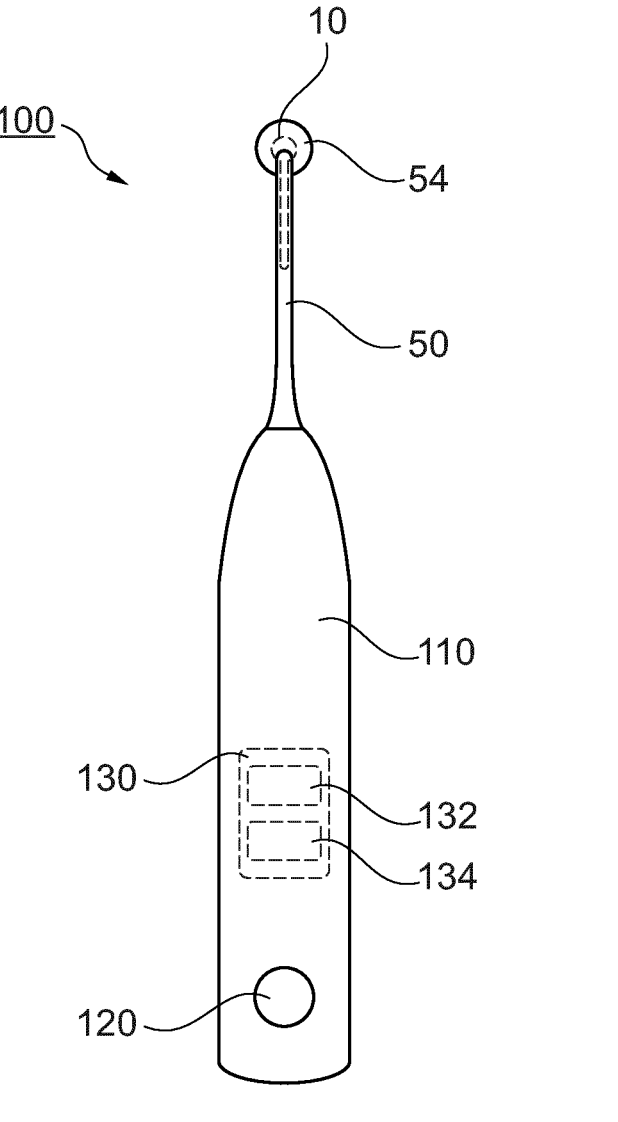
FIG. 13 is a schematic representation of an oral care device, in accordance with an embodiment.

FIGS. 1 to 11 show examples of an interdental space detection component 10 for use with an oral care device 100 (see FIG. 13). The interdental space detection component 10 comprises an interdental probe 12 insertable into an oral cavity of a user for interdental space detection. The detection may be based on electric, pressure, and/or optical detection.

In the examples illustrated in FIGS. 1 to 6, the detection is based on electric detection. The interdental probe 12 comprises at least one electronic element 14 configured to be sensitive to being wedged between two neighboring teeth. Detecting or measuring deformation present on two opposite sides of the interdental probe may be used to determine whether the interdental probe is wedged between two neighboring teeth. Alternatively or additionally, force may be detected by using e.g. strain gauges or piezo elements when the interdental probe is wedged between two neighboring teeth.

Figure 1A:
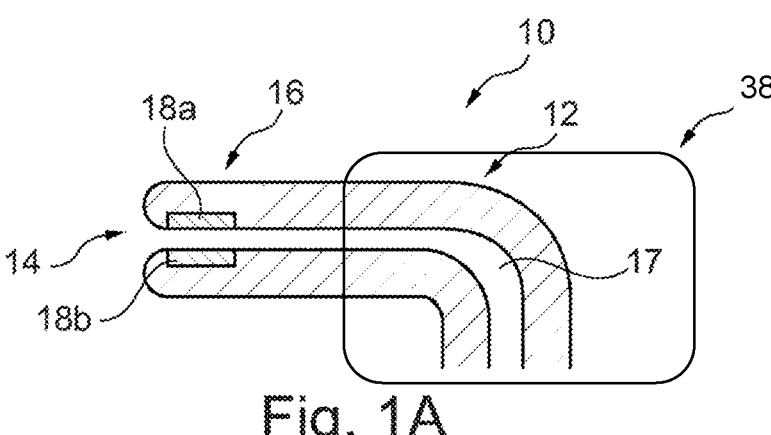
FIG. 1A is a schematic representation of an interdental space detection component, in accordance with an embodiment.
Figure 1B:
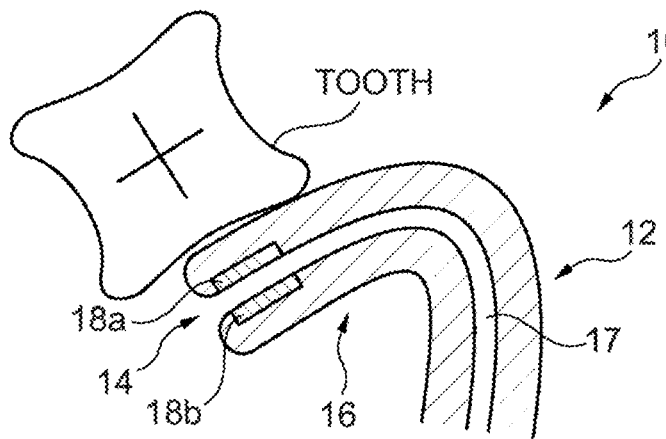
FIG. 1B shows the interdental probe of FIG. 1A in a first position corresponding to a position that the interdental probe bumps onto a tooth.
Figure 1C:
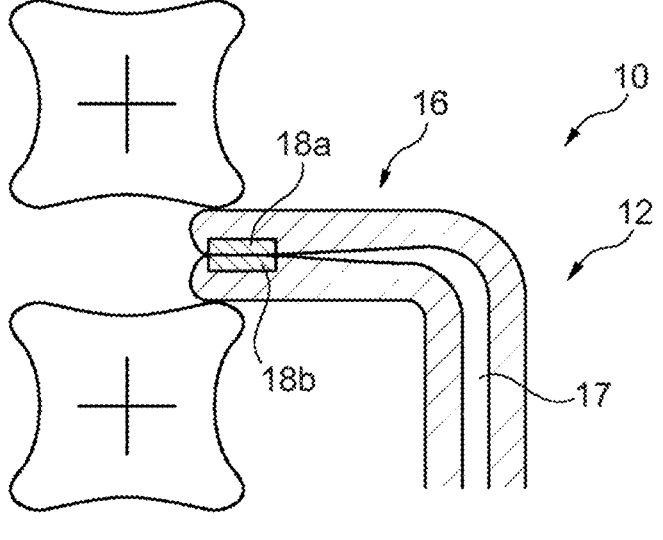
FIG. 1C shows the interdental probe of FIG. 1A in a second position corresponding to a position that the interdental probe is wedged in an interdental space between neighboring teeth.

FIGS. 1A to 1C show an example of an interdental probe 12. In this example, as illustrated in FIG. 1A, the interdental probe 12 is L-shaped, with a frontal portion 16 dimensioned for being at least partially insertable into an interdental space between two neighboring teeth. For example, the frontal portion 16 may have a cylindrical shape with a diameter of 1 mm to 4 mm. The interdental probe 12 may comprise a flexible material, such as flexible plastic or polymer. The interdental probe 12 comprises a channel 17, which may be a liquid channel for delivering a flow of fluid.

The at least one electronic element 14 comprises at least two contact pads, such as contact pads 18a, 18b, which may be arranged on the inner surface of the interdental probe 12 close to a channel exit of the frontal portion 16. The at least two contact pads 18a, 18b may be electrodes. The at least two contact pads 18a, 18b are configured to connect to form a closed circuit when wedged between two neighboring teeth.

FIG. 1B shows the interdental probe 12 in a first position corresponding to a position that the interdental probe 12 bumps onto a tooth. This position will result in a bending of the channel 17, which, however, does not cause the contact between the at least two contact pads 18a, 18b.

In contrast, FIG. 1C shows the interdental probe 12 in a second position corresponding to a position that the interdental probe 12 is wedged in an interdental space between neighboring teeth. The at least two contact pads 18a, 18b contact to form a closed circuit in the second position. An electric current is thus induced, which may be used as an indicator of a presence of teeth on two sides of the interdental probe within the oral cavity.

FIGS. 2A to 2D show a further example of an interdental probe 12. In this example, the interdental probe 12 has a cylindrical shape, which is dimensioned for being at least partially insertable into an interdental space between two neighboring teeth. The interdental probe 12 has a channel 17, which may be a liquid channel for delivering a flow of fluid.

In this example, the interdental probe 12 comprise four radially-segmented portions. Of course, the interdental probe 12 may comprise more radially-segmented portions, such as six, eight, ten, twelve, or more radially-segmented portions. Each portion comprises a respective contact pad 18a, 18b, 18c, 18d. These contact pads 18a, 18b, 18c, 18d are configured to connect to form a closed circuit when wedged between two neighboring teeth. For example, the interdental probe 12 may have a flexible material, such that deformation on opposite sides of the interdental probe can be detected.

Figures 2A, 2B, 2C, 2D:
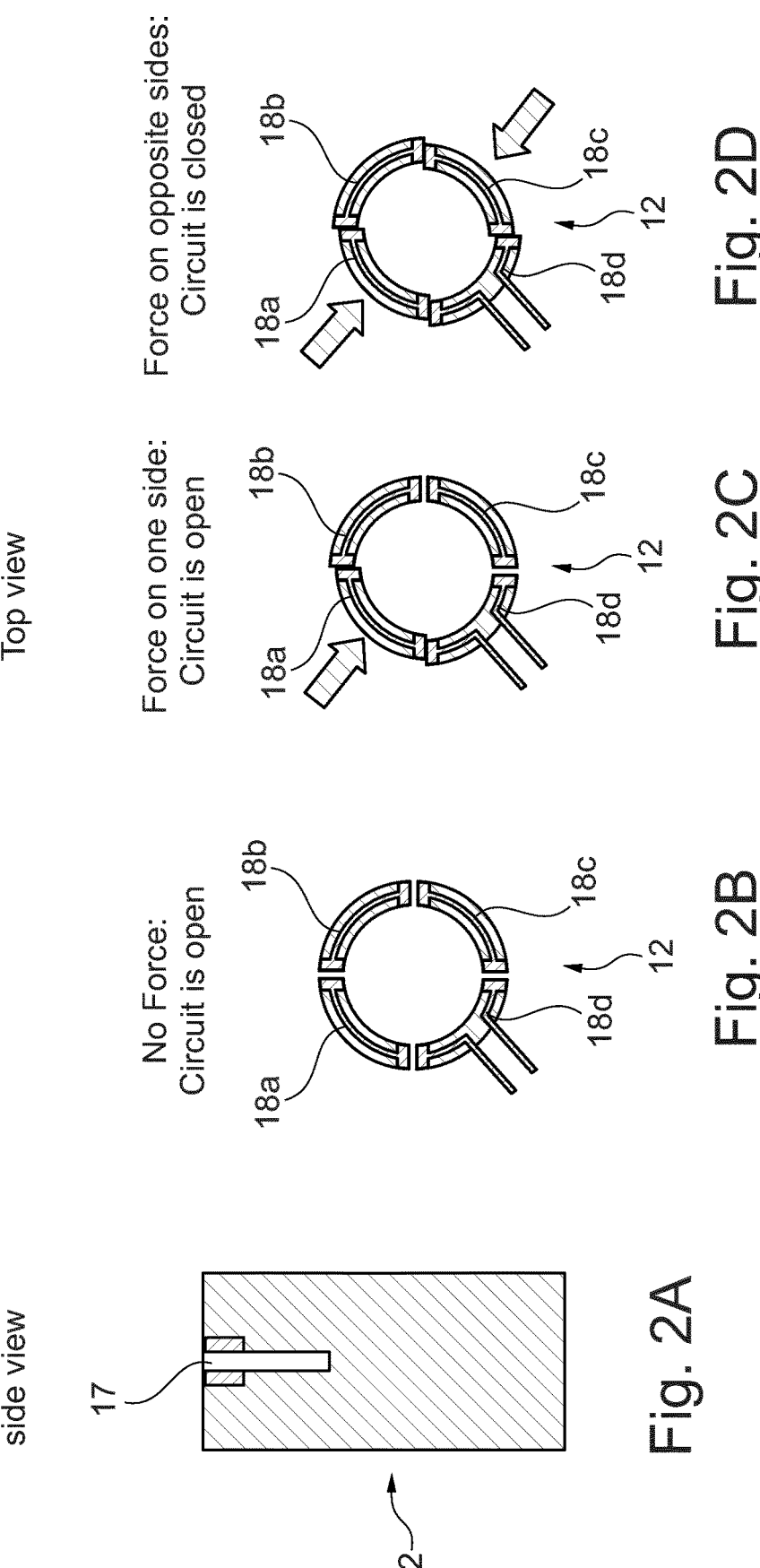
FIG. 2A is a schematic representation of an interdental space detection component, in accordance with a further embodiment.
FIG. 2B shows that no force is applied to the interdental probe of FIG. 2A.
FIG. 2C shows the interdental probe of FIG. 2A in a first position corresponding to a position that the interdental probe bumps onto a tooth.
FIG. 2D shows the interdental probe of FIG. 2A in a second position corresponding to a position that the interdental probe is wedged in an interdental space between neighboring teeth.

FIG. 2B shows that no force is applied to the interdental probe 12. The radially-segmented portions are distanced from each other and thus the circuit is open.

FIG. 2C shows the interdental probe 12 in a first position corresponding to a position that the interdental probe 12 bumps onto a tooth. In this position, force is present on one side of the interdental probe 12, which causes the contact of three contact pads 18a, 18b, 18d. However, the circuit is still open as the contact pad 18c is not connected.

In contrast, FIG. 2D shows the interdental probe 12 in a second position corresponding to a position that the interdental probe 12 is wedged in an interdental space between neighboring teeth. In this case, force is present on opposite sides of the interdental probe 12. The deformation on opposite sides of the interdental probe thus causes a connection of all contact pads 18a, 18b, 18c, 18d. An electric current is thus induced, which may be used as an indicator of a presence of teeth on two sides of the interdental probe within the oral cavity.

Figure 3A:
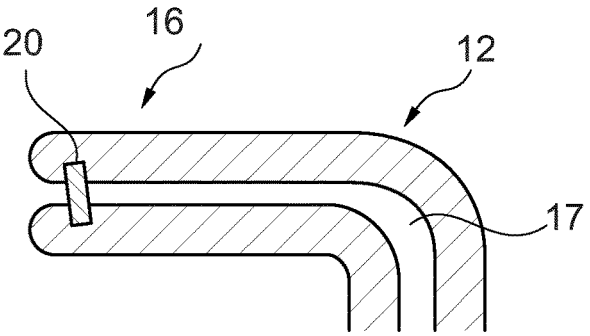
FIG. 3A is a schematic representation of an interdental space detection component, in accordance with a further embodiment.
Figure 3B:
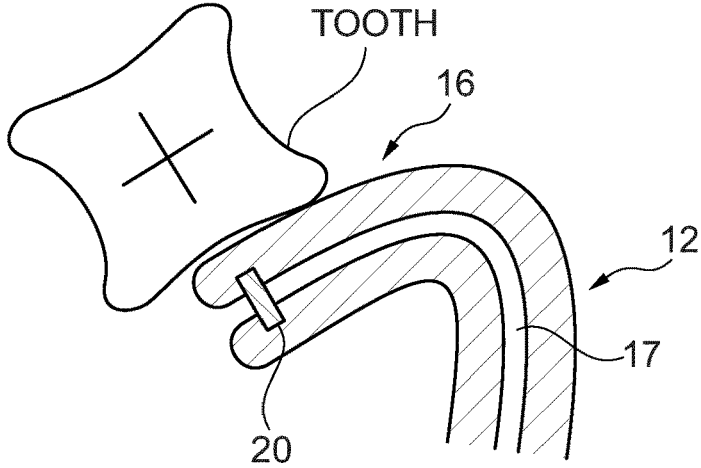
FIG. 3B shows the interdental probe of FIG. 3A in a first position corresponding to a position that the interdental probe bumps onto a tooth.
Figure 3C:
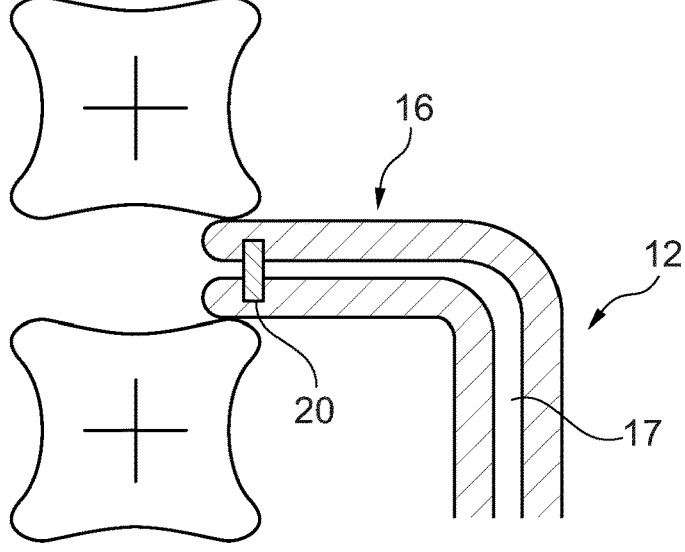
FIG. 3C shows the interdental probe of FIG. 3A in a second position corresponding to a position that the interdental probe is wedged in an interdental space between neighboring teeth.

FIGS. 3A to 3C show an example of an interdental probe 12. In this example, as illustrated in FIG. 3A, the interdental probe 12 has a shape and comprises a channel 17 substantially the same as described above with respect to FIGS. 1A to 1C.

In this example, the at least one electronic element comprise a force and/or pressure sensor 20, which is configured to be stressed when wedged between two neighboring teeth. In this example, the force and/or pressure sensor 20 is be arranged close to the channel exit of the frontal portion 16 and sandwiched between two inner surfaces of the interdental probe 12.

FIG. 3B shows the interdental probe 12 in a first position corresponding to a position that the interdental probe 12 bumps onto a tooth. This position will result in a bending of the channel 17, which, however, does not cause a transmission of force through the force and/or pressure sensor 20.

In contrast, FIG. 3C shows the interdental probe 12 in a second position corresponding to a position that the interdental probe 12 is wedged in an interdental space between neighboring teeth. As the interdental probe 12 is wedged between two neighboring teeth, a force is transmitted through the force and/or pressure sensor 20. Accordingly, a force will be detected, which may be used as an indicator of a presence of teeth on two sides of the interdental probe within the oral cavity.

Figure 4A:
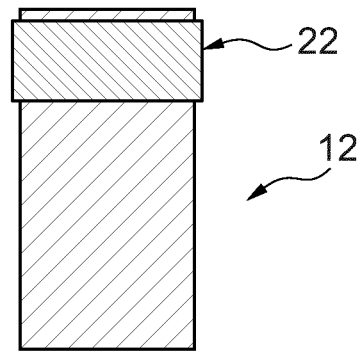
FIG. 4A is a schematic representation of an interdental space detection component, in accordance with a further embodiment.
Figure 4B:
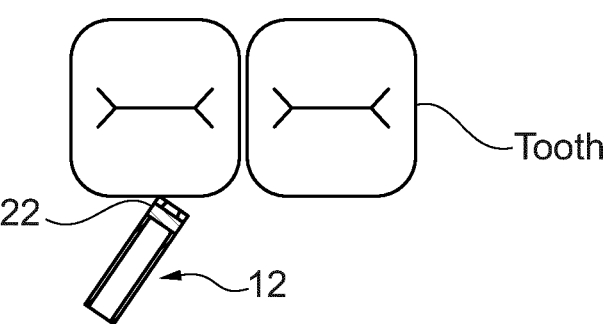
FIG. 4B shows the interdental probe of FIG. 4A in a first position corresponding to a position that the interdental probe bumps onto a tooth.
Figure 4C:
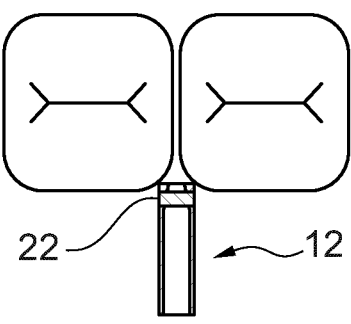
FIG. 4C shows the interdental probe of FIG. 4A in a second position corresponding to a position that the interdental probe is wedged in an interdental space between neighboring teeth.

FIGS. 4A to 4C show a further example of an interdental probe 12. In this example, the interdental probe 12 has a cylindrical shape. In some examples, the interdental probe 12 may have a channel for delivery a flow of fluid. In some other examples, no channel is provided. A sensor array 22, such as several separate sensors or a pixelated sensor array, may be radially arranged on an outer surface of the interdental probe 12, for example, near a distal tip of the interdental probe 12. The sensor array 22 may comprise e.g. pressure sensors, force sensors, etc.

The interdental probe 22 may comprise a flexible material, such as flexible plastic or polymer.

FIG. 4B shows the interdental probe 12 in a first position corresponding to a position that the interdental probe 12 bumps onto a tooth. In this position, only a single force is detected by the sensor array 22.

In contrast, FIG. 4C shows the interdental probe 12 in a second position corresponding to a position that the interdental probe 12 is wedged in an interdental space between neighboring teeth. As the interdental probe 12 is wedged between two neighboring teeth, two opposite forces are detected, which may be used as an indicator of a presence of teeth on two sides of the interdental probe within the oral cavity.

Figure 5A:
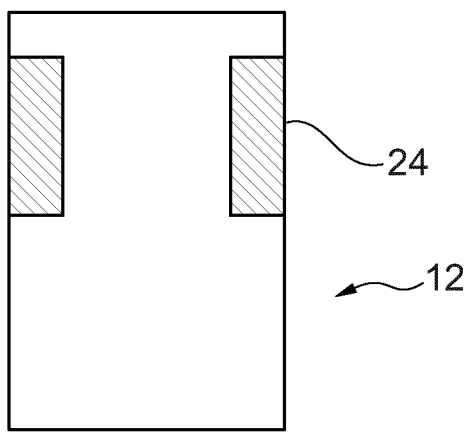
FIG. 5A is a schematic representation of an interdental space detection component, in accordance with a further embodiment.
Figure 5B:
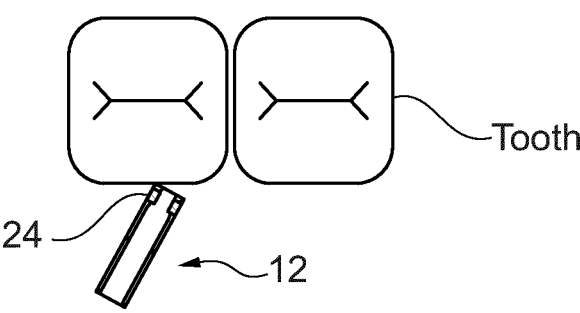
FIG. 5B shows the interdental probe of FIG. 5A in a first position corresponding to a position that the interdental probe bumps onto a tooth.
Figure 5C:
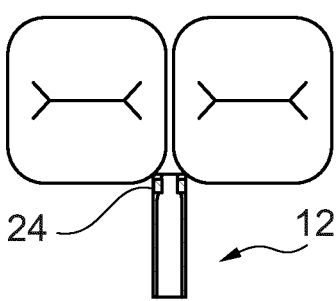
FIG. 5C shows the interdental probe of FIG. 5A in a second position corresponding to a position that the interdental probe is wedged in an interdental space between neighboring teeth.

FIG. 5A to 5C show a further example of an interdental probe 12. In this example, a strain gauge 24 is attached to the interdental probe for detecting deformation at opposite sides of the interdental probe when wedged between two neighboring teeth. In this example, two strain gauges are radially arranged on opposite sides of the interdental probe 12, for example, near a distal tip of the interdental probe 12. In another example (not shown), more strain gauges may be provided.

A strain gauge is a sensor whose resistance varies with applied force. It converts force, pressure, tension, weight, etc., into a change in electrical resistance, which can then be measured. When external forces are applied to a stationary object, stress and strain are the result. Stress is defined as the object's internal resisting forces, and strain is defined as the displacement and deformation that occur.

FIG. 5B shows the interdental probe 12 in a first position corresponding to a position that the interdental probe 12 bumps onto a tooth. In this position, deformation is present on one side of the interdental probe, which is detected by one stain gauge.

In contrast, FIG. 5C shows the interdental probe 12 in a second position corresponding to a position that the interdental probe 12 is wedged in an interdental space between neighboring teeth. As the interdental probe 12 is wedged between two neighboring teeth, deformation is present on opposite sides of the interdental probe 12, which is detected by both strain gauges. The detection of deformation on opposite sides of the interdental probe 12 may be used as an indicator of a presence of teeth on two sides of the interdental probe within the oral cavity.

Figure 6A:
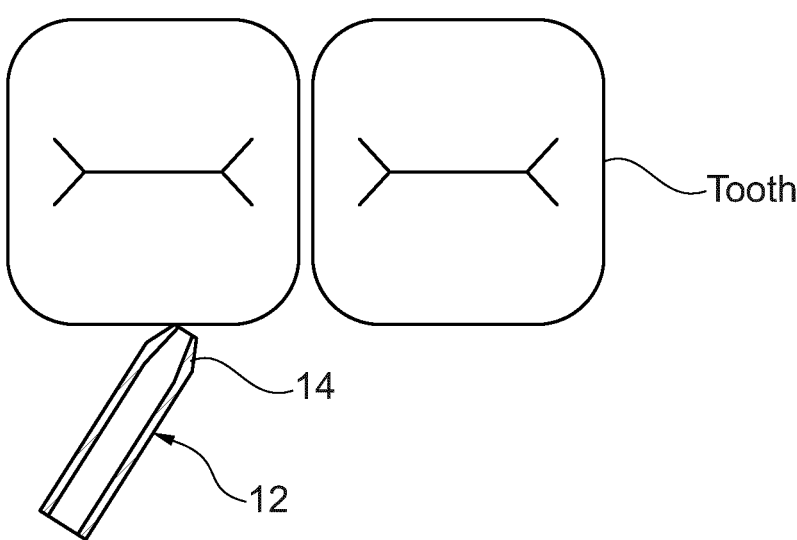
FIG. 6A shows an interdental probe, in accordance with a further embodiment, in a first position corresponding to a position that the interdental probe bumps onto a tooth.
Figure 6B:
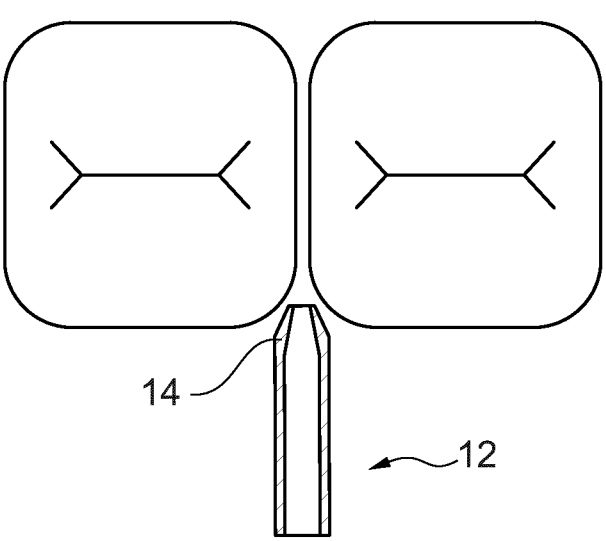
FIG. 6B shows the interdental probe of FIG. 6A in a second position corresponding to a position that the interdental probe is disposed in an interdental space between neighboring teeth.

FIGS. 6A and 6B show a further example of an interdental probe 12. While the examples illustrated in FIGS. 1 to 5 use force or displacement sensing, the interdental probe 12 in this example comprises at least one electronic element 14 configured to detect respective contacts or distances on two sides of the interdental probe. In other words, it is possible to measure contact or close range distance on opposite sides of the interdental probe 12.

Many close range distance or contact measuring principles may be used, e.g. inductive sensing, capacitive sensing, optical sensing or acoustic (e.g. ultrasonic) distance sensors. As the teeth are coated with saliva, contact may also be measured by electrical conductance.

In this example, the interdental probe 12 has a cylindrical shape with e.g. inductive sensors, capacitive sensors, optical sensors, and/or acoustic sensors, radially arranged near a distal end of interdental probe 12. In some examples, the distal end may have a nozzle exit.

FIG. 6A shows the interdental probe 12 in a first position corresponding to a position that the interdental probe 12 bumps onto a tooth. In this case, it is possible to measure contact or close range distance on one side of the interdental probe 12.

In contrast, FIG. 6B shows the interdental probe 12 in a second position corresponding to a position that the interdental probe 12 is disposed in an interdental space between neighboring teeth. In this case, it is possible to measure contact or close range distance on opposite sides of the interdental probe 12, which may be used as an indicator of a presence of teeth on two sides of the interdental probe within the oral cavity.

The above-described examples usually require electronics, such as force, pressure, and/or displacement sensors to be arranged on the interdental probe. This may require more complex manufacturing and hence higher costs of e.g. oral cleaning head, which is usually a replacement item for which low cost is a requirement. The examples would not require any electronics in the brush head.

Figure 7A:
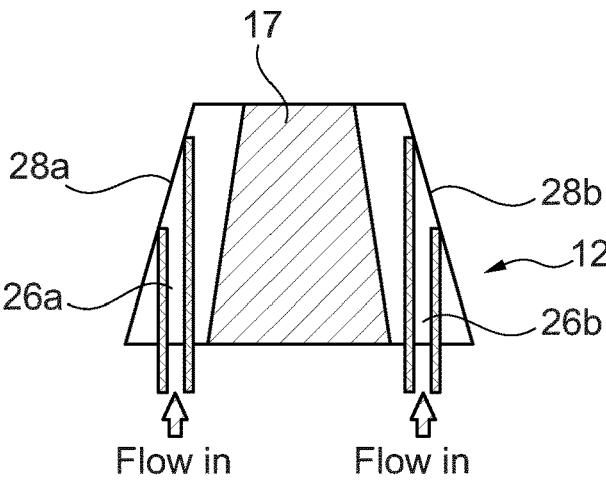
FIG. 7A is a schematic representation of an interdental space detection component, in accordance with a further embodiment.
Figure 7B:
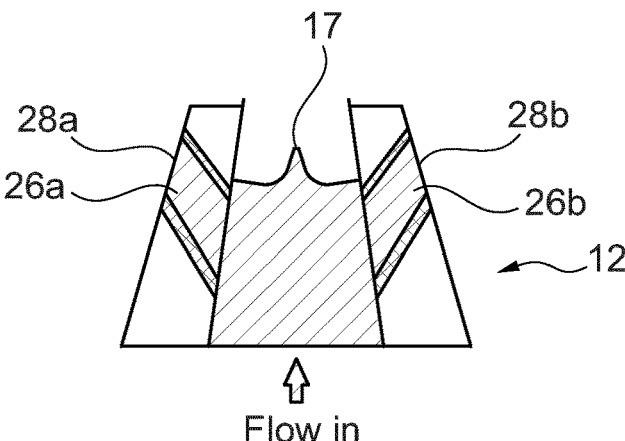
FIG. 7B is a schematic representation of an interdental space detection component, in accordance with a further embodiment.

FIGS. 7A and 7B schematically show two further examples of an interdental probe 12. In both examples, the detection is based on pressure detection. The interdental probe 12 comprises a first fluid channel 26a and a second fluid channel 26b for delivering a flow of fluid to two fluid-exit positions 28a, 28b on the interdental probe for detecting a pressure change in both the first and second fluid channels due to a presence of teeth on two sides of the interdental probe. In other words, detecting blocking of flow may also be used to detect contact with the teeth, without adding electronics in the replaceable brush head. Both opposite sides should harbor a channel, i.e. the first fluid channel 26a and the second fluid channel 26b, that delivers a flow of fluid, which can be gas or liquid.

Each fluid channel 26a, 26b may be connected to a fluid feeding system in the body portion of an oral care device having a pressure sensor in the system. If both channels are blocked by the opposing teeth of an interdental space, both pressures will go up, indicating the nozzle is positioned between the teeth. To enable proper blocking the sensing channel ending may be made of an elastomer, sealing the sensing nozzle exit effectively when touching the teeth.

FIG. 7A illustrates an example that has one fluidic system for the sensor and another fluidic system for the interdental cleaning burst.

Having two fluidic systems is relatively complicated. This may be simplified by the approach illustrated in FIG. 7B. In this case, a single fluidic system drives all three fluid channels, but the main cleaning nozzle is during the sensing mode (i.e. low flow rate) closed by a valve which needs a certain minimal pressure to open (e.g. 1 bar). If only one fluid channel is closed, the pressure goes up in the system. Only when both fluid channels are closed, a certain threshold of pressure increase (but still below the valve opening pressure) is obtained, which indicates that the system is at the interdental space. At that point, a pump may be signaled to produce a high pressure pulse (e.g. 3 to 10 bar) that would open the valve and drive a cleaning burst out of the main nozzle. Gas could be used for sensing. But for the example illustrated in FIG. 7B, using liquid only is more likely, since the liquid pump system is anyway available for the cleaning burst. During the sensing mode, there would be still liquid flowing from the system, but the flow rate may be very low (e.g. 1 to 10 ml/min).

Figure 8:
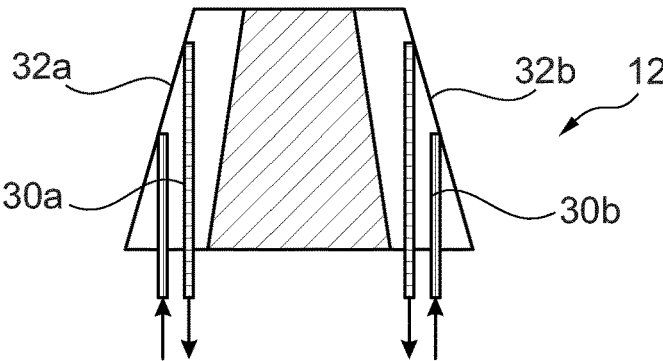
FIG. 8 is a schematic representation of an interdental space detection component, in accordance with a further embodiment.

FIG. 8 schematically shows a further example of an interdental probe 12. In this example, the detection is based on optical detection. The interdental probe 12 comprises a first optical channel 30a and a second optical channel 30b for delivering light to two light-exit positions 32a, 32b on the interdental probe 12 for detecting respective distances of the two light-exit positions with respect to teeth on two sides of the interdental probe.

For example, the interdental probe 12 may be equipped with fiber optic elements. The light source and sensor may be arranged in the body portion of an oral care device, but transported to and from the tip using an optic fiber. The light intensity that comes out will depend on the distance of the two fiber exits from the tooth surface. The design of the fibers and their distance and angulation with respect to each other will determine the intensity profile with distance. If close together, the intensity will increase when the fiber exits get closer to the teeth. When touching the teeth there will be a drop in intensity, as at least one fiber gets blocked, and the light can only travel through the teeth to the other fiber. The drop will also be determined by the light wavelength: short wavelengths (e.g. UV, blue) will drop more intensity in the tooth enamel than long ones (e.g. red, NIR). Possibly blue may be preferred, as this will give most drop in the intensity on contact, and has low cost LED sources available (unlike UV). If the opposite nozzle sides signals both go from high intense to low intense the system very selectively detects an interdental space, as both sides are contacting a tooth surface. The readout of intensity may be done at low cost in the brush handle, for example.

Figure 9A:
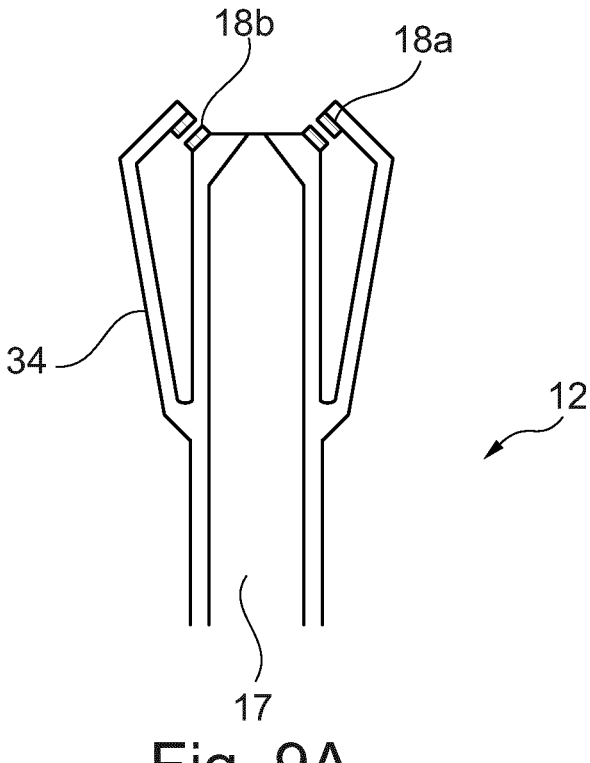
FIG. 9A is a schematic representation of an interdental space detection component, in accordance with a further embodiment.
Figure 9B:
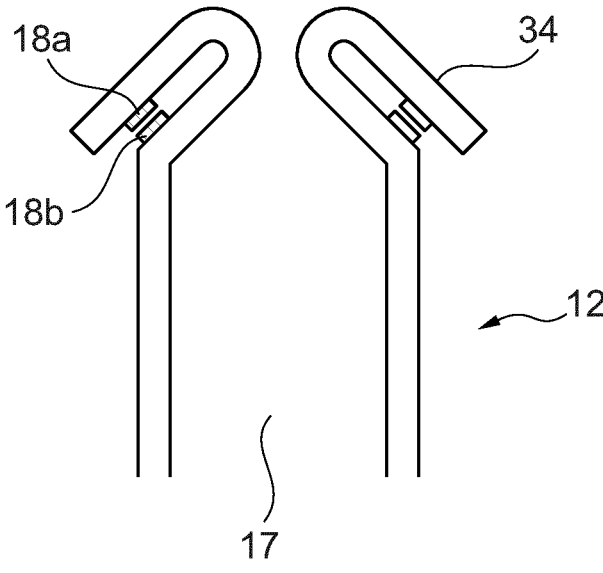
FIG. 9B is a schematic representation of an interdental space detection component, in accordance with a further embodiment.

FIGS. 9A and 9B schematically shows two further examples of an interdental probe 12. In both examples, a flexible element 34 is provided that extends from the interdental probe 12 on at least two opposite sides of the interdental probe. The interdental probe 12 is configured to detect a presence of teeth on two sides of the flexible element within the oral cavity. In an example, as illustrated in FIGS. 9A and 9B, the flexible element 34 may is a flexible ring element. In another example (not shown), the flexible element 34 may comprise more flexible ring elements.

In FIG. 9A, for example, the flexible ring element 34 is provided that are arranged around the interdental probe 12, thereby forming gaps between the interdental probe 12 and the flexible ring element. When the interdental probe 12 is wedged in an interdental space between neighboring teeth, the gaps between the interdental probe 12 and the flexible ring element become narrow or even closed. Such deformation may be measured with one or more above-described approaches, e.g. a strain gauge, an optical sensor, an inductive sensor, contact pads, etc. In this example, contact pads 18a, 18d are provided for detecting the deformation.

FIG. 9B illustrates another example of the flexible element 34. In this example, the flexible element extends from one distal end, e.g. the nozzle exit, of the interdental probe towards the other distal end of the interdental probe 12, thus forming a gap therebetween. The detection method is substantially the same as described above with respect to FIG. 9A.

In most of the above embodiments, there is a focus on a primarily static deformation of the interdental probe as it enters and is trapped by the interdental space. However, in many cases the interdental probe will be vibrating at the frequency of the toothbrush around 265 Hz, as it leaves and enters the interdental space. For probes which are thinner than the interdental space the interdental probes will most probably also be vibrating within the interdental space— particularly for larger interdental spaces. Whilst this may appear to be a complicating factor, in this example it is proposed to use the fact that the interdental probe is vibrating at a known frequency to actually increase the specificity and sensitivity of the interdental probe in detecting the interdental space. This is achieved by now monitoring signals of any of the above examples, which are locked in to the vibrational frequency of the brush or alternatively a harmonic or fractional frequency of the brush. This may involve adding a notch filter to the detection circuit with a notch around the vibrational frequency and/or the harmonic.

FIGS. 10A, 10B, 11A, and 11B show two further examples of an interdental probe 12. In both examples, the interdental probe 12 is configured to vibrate at a vibrational frequency within an interdental space between two neighboring teeth and to provide an output signal, the frequency of which is dependent on a presence of teeth on two sides of the interdental probe. Thus, the frequency may be used as an indicator of a presence of teeth on two sides of the interdental probe within the oral cavity.

Figures 10A, 10B:
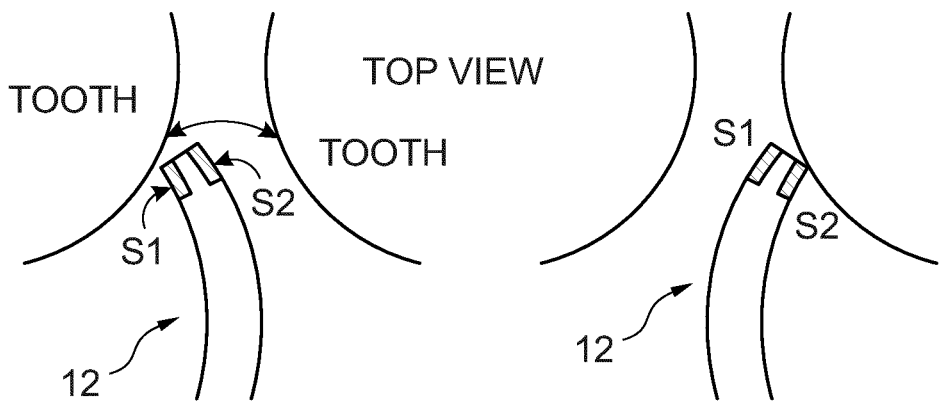
FIGS. 10A and 10B are a schematic representation of an interdental space detection component, in accordance with a further embodiment.

FIGS. 10A and 10B show a first example where the interdental probe 12 has a component of vibration parallel to the gum line. In this case, as the interdental probe 12 vibrates the interdental probe sweeps from side to side as it enters the interdental space. As such the two sensors S1 and S2 will be sequentially activated as first the interdental probe strikes one side of the interdental cavity and then the other side. In this case, each probe strikes at the vibrational frequency. If, however, there is just a single sensor at the interdental probe tip, this will actually be activated twice in one brush cycle—hence in this case preferably the interdental probe is locked in to the first harmonic of the frequency (i.e. 2 times the brush frequency).

The rationale behind this example is that as the interdental probe moves into the interdental space but before it becomes trapped (if it traps at all), it will start to make contact with the two sides of the interdental space. In this case, there will be a deformation of the interdental probe each time it hits a wall, creating a modulation of the interdental probe signal with a frequency double the brush frequency. If, for example, the brush has a frequency of 265 Hz, the interdental probe will hit the interdental spaces 2×263–530 times a second. For this reason, a lock-in at the first harmonic of the brush frequency is particularly advantageous. In the case where there are multiple probes and one probe contacts one side of the interdental space and the other probe the other side, the lock-in frequency of each probe should be the brush frequency.

Figures 11A, 11B:
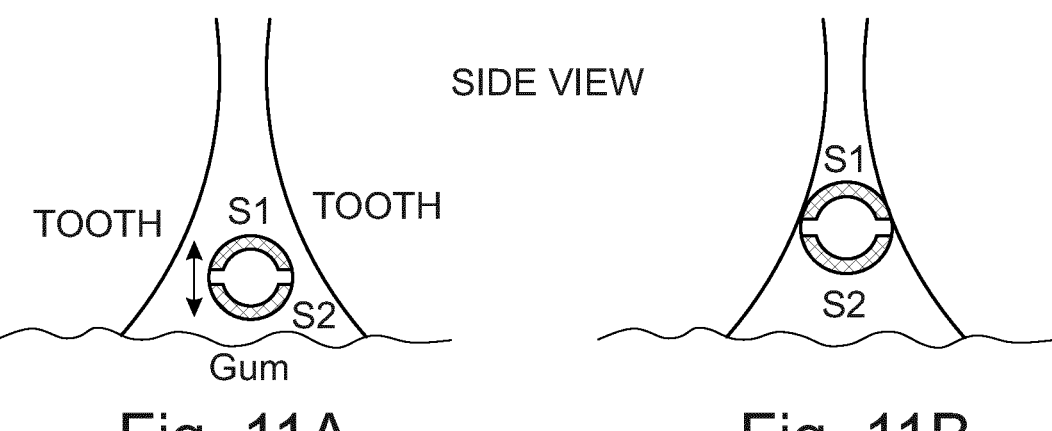
FIGS. 11A and 11B are a schematic representation of an interdental space detection component, in accordance with a further embodiment.

FIGS. 11A and 11B show a second example where the toothbrush has a component of vibration perpendicular to the gum line. In this drawing, we are looking at the cross section of the tip of the interdental probe, which moves up and down as the brush vibrates. In this case, as the interdental probe sweeps up and down as it enters the interdental space whereby only sensor S1 will be activated at the brushing frequency as it strikes the interdental cavity. Sensor S2 may then sequentially strike the gum, but as this is much softer will produce a much smaller signal.

In some examples, the interdental probe 12 may be specifically designed to vibrate at a lower frequency than the rest of the bristles of the brush (e.g. at the half frequency) it would then be preferred to lock in to the frequency of vibration of the interdental probe.

Figure 12:
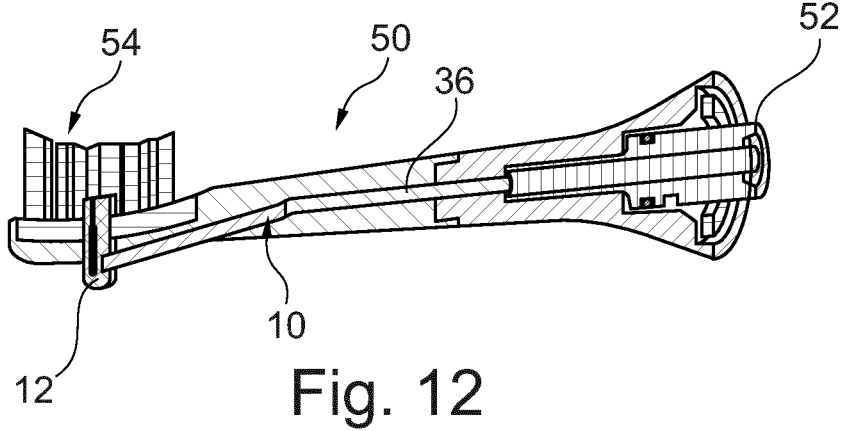
FIG. 12 is a schematic representation of an oral care implement, in accordance with an embodiment.

FIG. 12 shows an example of an oral care implement 50. In this example, the oral care implement 50 is a brush head. The oral care implement 50 comprises an interdental space detection component 10, as described herein. The interdental space detection component 10 comprises an interdental probe 12 as described herein. A neck 36 may be provided to enable the interdental space detection component 10 to be mounted to a body of the oral care implement 50. The oral care implement 50 may have a curved portion at the distal end thereof, to assist in convenient positioning of the oral care implement 50 in the mouth by the user. The oral care implement 120 may have a function head 54 at the distal end thereof. The oral care implement 50 also comprises a connection portion 52 for connecting the oral care implement to the oral care device FIG. 13 schematically shows an example of an oral care device 100 used to clean the interproximal spaces between teeth. In this example, the oral care device is a toothbrush. The oral care device 100 comprises a body portion 110 designed to be held in a user's hand, and an oral care implement 50 as described herein. The oral care implement 50 may be integrated into the body portion 110 or removably coupled to the body portion 110.

The oral care device 100 may also include a user interface 120 used to turn the device on or off or implement operation, and may provide for communication with the user. The oral care device 100 also includes a controller 130, which is part of control system 200 shown in FIG. 14. The controller 130 may be formed of one or multiple modules, and is configured to operate the oral care device 100 in response to an input. The controller 130 can comprise, for example, a processor 132 and a memory 134. According to an embodiment, an operating system may contain code which, when executed by the controller 130, controls operation of the hardware components of oral care device 100.

Figure 14:
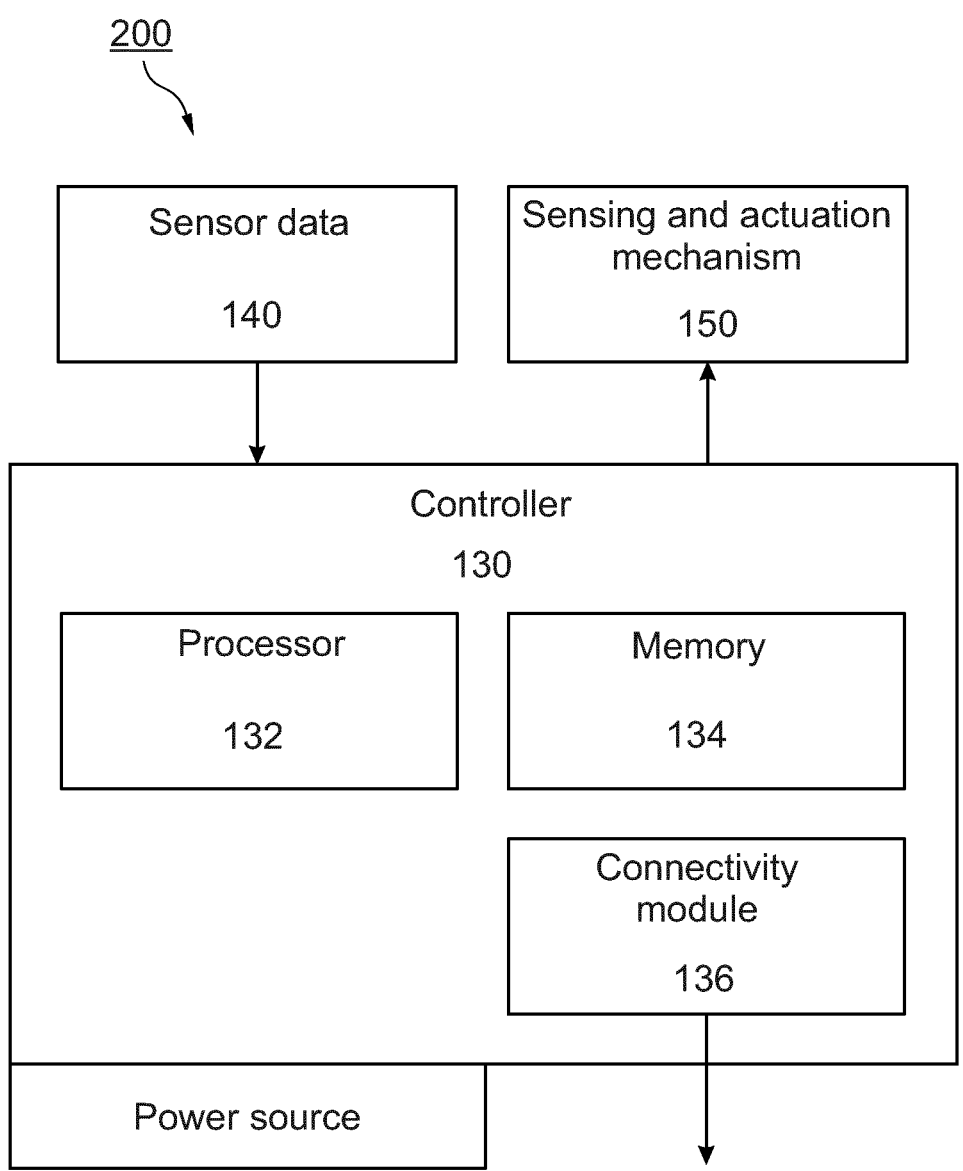
FIG. 14 is a schematic representation of a control system, in accordance with an embodiment.

FIG. 14 schematically shows an example of a control system 200 of the oral care device 100. The control system 200 comprises a controller 130 with a processor 132 and a memory 134, which can store an operating system as well as sensor data. The system may also comprise a power source. The control system 200 can optionally include a user interface 120, as shown in FIG. 13, which is configured to transmit or receive information to the user. Sensor data 140 is generated in response to the motion of the interdental probe inside the oral cavity and communicated to the controller 130.

A connectivity module 136 of the device can be configured and/or programmed to receive and/or transmit data from or to a wireless transceiver (not shown). For example, connectivity module 136 may transmit sensor data via a Wi-Fi connection over the internet or an intranet to a dental professional, a database, or other location. Alternatively, the connectivity module 136 may receive and/or transmit sensor or feedback data via a Bluetooth or other wireless connection from or to a local device (e.g., a separate computing device), database, or other transceiver. For example, the connectivity module 36 allows the user to transmit sensor data to a separate database to be saved for long-term storage, to transmit sensor data for further analysis, to transmit user feedback to a separate user interface, or to share data with a dental professional, among other uses. The connectivity module 136 may also be a transceiver that can receive user input information, such as interproximal spacing information. Other communication and control signals described herein can be effectuated by a hard wire (non-wireless) connection, or by a combination of wireless and non-wireless connections.

According to an embodiment, the control system 200 of the oral care device 100 can be programmed and/or configured to automatically and dynamically adjust an oral care routine via a sensing and actuation mechanism 150, based on interproximal spacing. For example, as disclosed or otherwise envisioned herein, oral care device 100 can modify an output of the function head 54 or other component of the oral care device in order to adapt to a specific interproximal space and improve cleaning of that space. According to another embodiment, oral care device 100 can modify a physical structure of the oral care implement itself to adapt to a specific interproximal space and improve cleaning of that space. According to yet another embodiment, oral care device 100 may adjust an output to adapt to a specific interproximal space, such as providing a larger or smaller amount of cleaning liquid ejected from the oral care device into the interproximal space during a certain timeframe, among other variations in output. For example, the system may increase the volume of liquid delivered by the device for larger interproximal spaces, and reduce the volume of liquid delivered by the device for smaller interproximal spaces. Many other embodiments of a dynamic sensing and actuation mechanism 150 are possible.

The controller 130 can receive the sensor data in real-time or periodically. For example, a constant stream of sensor data 140 may be sent to controller 130 for storage and/or analysis, or may be temporarily stored and aggregated or processed prior to being sent to the controller 130. Once received by the controller 130, the sensor data can be processed by processor 132 and the processor can direct the adjustment of the oral care routine accordingly.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. An interdental space detection component for use with an interdental care device, the interdental space detection component comprising:

16 an interdental probe insertable into an oral cavity of a user for interdental space detection;
wherein the interdental probe is configured to detect an interdental space by detecting a presence of teeth on two sides of the interdental probe within the oral cavity;
wherein the detection is based on electric detection; and
wherein the interdental probe comprises an electronic element configured to be sensitive to being wedged between two neighboring teeth, and wherein the electronic element comprises a sensor array configured to detect opposite forces when wedged between two neighboring teeth.

2. The interdental space detection component according to claim 1, wherein the electronic element comprises at least two contact pads configured to connect to form a closed circuit when wedged between two neighboring teeth.

3. Interdental space detection component according to claim 1, wherein the electronic element is configured to detect respective contacts or distances on two sides of the interdental probe and comprises at least one of:
an inductive sensor,
a capacitive sensor,
an optical sensor, and
an acoustic sensor.

4. The interdental space detection component according to claim 1, further comprising:
a flexible element extending from the interdental probe on at least two opposite sides of the interdental probe; and
wherein the interdental probe is configured to detect a presence of teeth on two sides of the flexible element within the oral cavity.

5. The interdental space detection component according to claim 1, wherein the interdental probe is provided in a mouthpiece.

6. An oral care implement for an oral care device, the oral care implement comprising:
the interdental space detection component according to claim 1; and
a connection portion for connecting the oral care implement to the oral care device.

7. The interdental space detection component according to claim 1, wherein the sensor array of the electronic element comprises a force sensor and/or a pressure sensor configured to be stressed when wedged between two neighboring teeth.

8. The interdental space detection component according to claim 1, wherein the sensor array of the electronic element comprises a strain gauge attachable to the interdental probe for detecting deformation at opposite sides of the interdental probe when wedged between two neighboring teeth.

9. The interdental space detection component according to claim 1, wherein the sensor array of the electronic element comprises a plurality of radially-segmented portions, wherein each radially-segmented portion comprises a respective contact pad configured to connect to form a closed circuit when wedged between two neighboring teeth.

10. The interdental space detection component according to claim 1, wherein the interdental probe further comprises a channel configured to deliver a flow of fluid between the two neighboring teeth.

11. An oral care device, comprising:
a) an interdental space detection component comprising an interdental probe insertable into an oral cavity of a user for interdental space detection;
wherein the interdental probe is configured to detect an interdental space by detecting a presence of teeth on two sides of the interdental probe within the oral cavity;

wherein the detection is based on electric detection; and wherein the interdental probe comprises an electronic element configured to be sensitive to being wedged between two neighboring teeth, and wherein the electronic element comprises a sensor array configured to detect opposite forces when wedged between two neighboring teeth; and b) a body portion arranged to comprise the interdental space detection component or be coupled to an oral care implement.

12. The oral care device according to claim 11, wherein the sensor array of the electronic element of the interdental probe comprises at least two contact pads configured to connect to form a closed circuit when wedged between two neighboring teeth.

13. The oral care device according to claim 11, wherein the sensor array of the electronic element of the interdental probe comprises a force sensor and/or a pressure sensor configured to be stressed when wedged between two neighboring teeth.

14. The oral care device according to claim 11, wherein the sensor array of the electronic element of the interdental probe comprises a strain gauge attachable to the interdental probe for detecting deformation at opposite sides of the interdental probe when wedged between two neighboring teeth.

15. The oral care device according to claim 11, wherein the sensor array of the electronic element of the interdental probe comprises a plurality of radially-segmented portions, wherein each radially-segmented portion comprises a respective contact pad configured to connect to form a closed circuit when wedged between two neighboring teeth.

16. The oral care device according to claim 11, wherein the interdental probe further comprises a channel configured to deliver a flow of fluid between the two neighboring teeth.

* * * * *